（12） United States Patent
Jones et al.

(10) Patent No.: US 10,359,309 B2
(45) Date of Patent: Jul. 23, 2019

(54) REMOTE WEIGHT MEASUREMENT OF A PRODUCT SUPPORT MEMBER

(71) Applicant: Walmart Apollo, LLC, Bentonville, AR (US)

(72) Inventors: Nicholaus A. Jones, Fayetteville, AR (US); Robert J. Taylor, Rogers, AR (US); Aaron J. Vasgaard, Rogers, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 186 days.

(21) Appl. No.: 15/643,705

(22) Filed: Jul. 7, 2017

(65) Prior Publication Data

US 2018/0010953 A1 Jan. 11, 2018

Related U.S. Application Data

(60) Provisional application No. 62/359,991, filed on Jul. 8, 2016.

(51) Int. Cl.
G01G 3/00 (2006.01)
G01G 9/00 (2006.01)
G01G 19/414 (2006.01)
G06Q 10/08 (2012.01)

(52) U.S. Cl.
CPC ............ G01G 9/005 (2013.01); G01G 3/00 (2013.01); G01G 19/4144 (2013.01); G06Q 10/087 (2013.01)

(58) Field of Classification Search
CPC ...... G01G 3/00; G01G 9/005; G01G 19/4144; G06Q 10/087
See application file for complete search history.

(56) References Cited

U.S. PATENT DOCUMENTS

| 2,903,273 A | 9/1959 | Hennion |
| 3,566,678 A | 3/1971 | Christmann |
| 3,713,333 A * | 1/1973 | MacGeorge ............ G01L 1/14 177/210 R |

(Continued)

FOREIGN PATENT DOCUMENTS

| JP | H0854279 | 2/1996 |
| WO | 2015102713 | 7/2015 |

OTHER PUBLICATIONS

International Search Report and Written Opinion dated Sep. 14, 2017; in corresponding PCT App. No. PCT/US2017/041086.

*Primary Examiner* — Randy W Gibson
(74) *Attorney, Agent, or Firm* — Fitch, Even, Tabin & Flannery LLP

(57) ABSTRACT

In some embodiments, systems, apparatuses and methods are provided herein useful to determine a weight of products on a product support structure. More specifically, the product support structure can be provided on a suspension system having one or more springs that can be monitored for compression to thereby determine a weight of products on the product support structure. In several embodiments, non-visible electromagnetic (EM) waves, can be directed at the spring and reflections of the non-visible EM waves can be received and analyzed to determine a compression of the spring.

21 Claims, 6 Drawing Sheets

(56) References Cited

U.S. PATENT DOCUMENTS

| | | | | |
|---|---|---|---|---|
| 4,623,029 A | * | 11/1986 | Bambauer | G01G 19/08 |
| | | | | 177/137 |
| 5,028,130 A | * | 7/1991 | Hoffmann | G01G 9/005 |
| | | | | 356/35 |
| 7,233,241 B2 | | 6/2007 | Overhultz | |
| 7,920,062 B1 | | 4/2011 | Konstad | |
| 8,893,977 B2 | | 11/2014 | Baarman | |
| 9,305,252 B1 | | 4/2016 | Fink | |
| 2006/0071774 A1 | | 4/2006 | Brown | |
| 2007/0050271 A1 | | 3/2007 | Ufford | |
| 2010/0013636 A1 | | 1/2010 | Wu | |
| 2013/0117053 A2 | | 5/2013 | Campbell | |

* cited by examiner

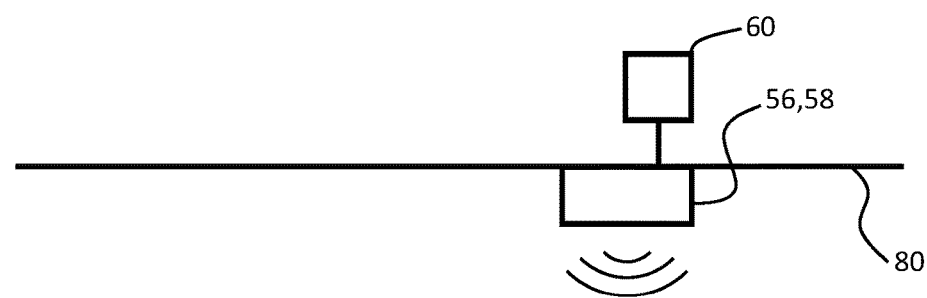
FIG. 3
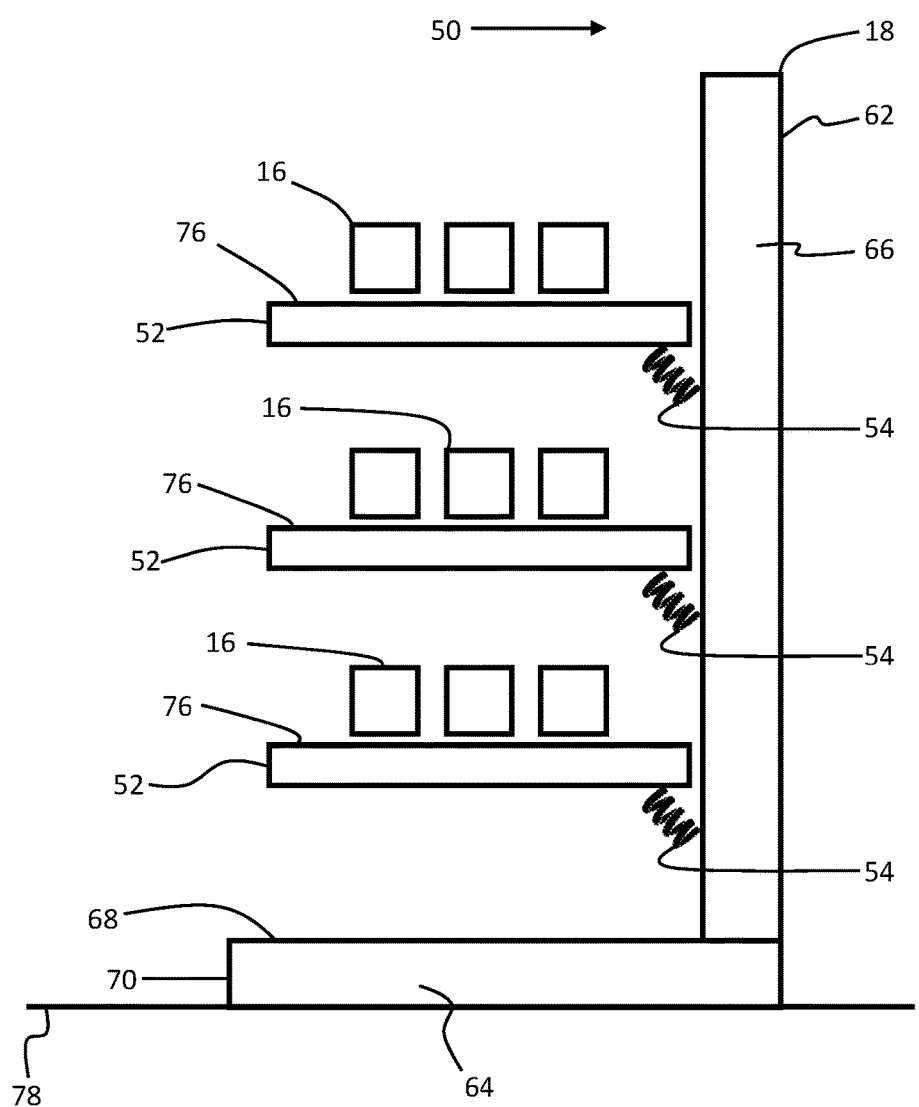

REMOTE WEIGHT MEASUREMENT OF A PRODUCT SUPPORT MEMBER

CROSS-REFERENCE TO RELATED APPLICATIONS

This application claims the benefit of U.S. 62/359,991, filed Jul. 8, 2016, which is hereby incorporated by reference herein in its entirety.

TECHNICAL FIELD

This invention relates generally to remote weight measurement and, more particularly, remote weight measurement of a product support member.

BACKGROUND

Tracking inventory within a shopping facility can be important to a retailer. For example, if a product is out of stock on the shelf, the shopping facility could be losing potential sales. As such, shopping facilities can send associates around the store to check on stock levels, but this can waste time and money when stock levels are satisfactory. Additionally, while a shopping facility may be able to determine a general number of customers within a store, it can be more difficult to determine how many products customers are purchasing, which can lead to long check-out lines and low stock levels.

BRIEF DESCRIPTION OF THE DRAWINGS

Disclosed herein are embodiments of systems, apparatuses and methods pertaining to determining a weight of products on a product support structure. This description includes drawings, wherein:

FIG. 3 is a second embodiment of a product weight estimation system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to determine a weight of products on a product support structure. More specifically, the product support structure can be provided on a suspension system that can be monitored for compression to thereby determine a weight of products on the product support structure. In some embodiments, non-visible electromagnetic (EM) waves, such as infrared or micro waves, can be directed at the suspension, which can include a metal spring, and reflections of the non-visible EM waves can be received and analyzed to determine a compression of the spring.

Figure 1:
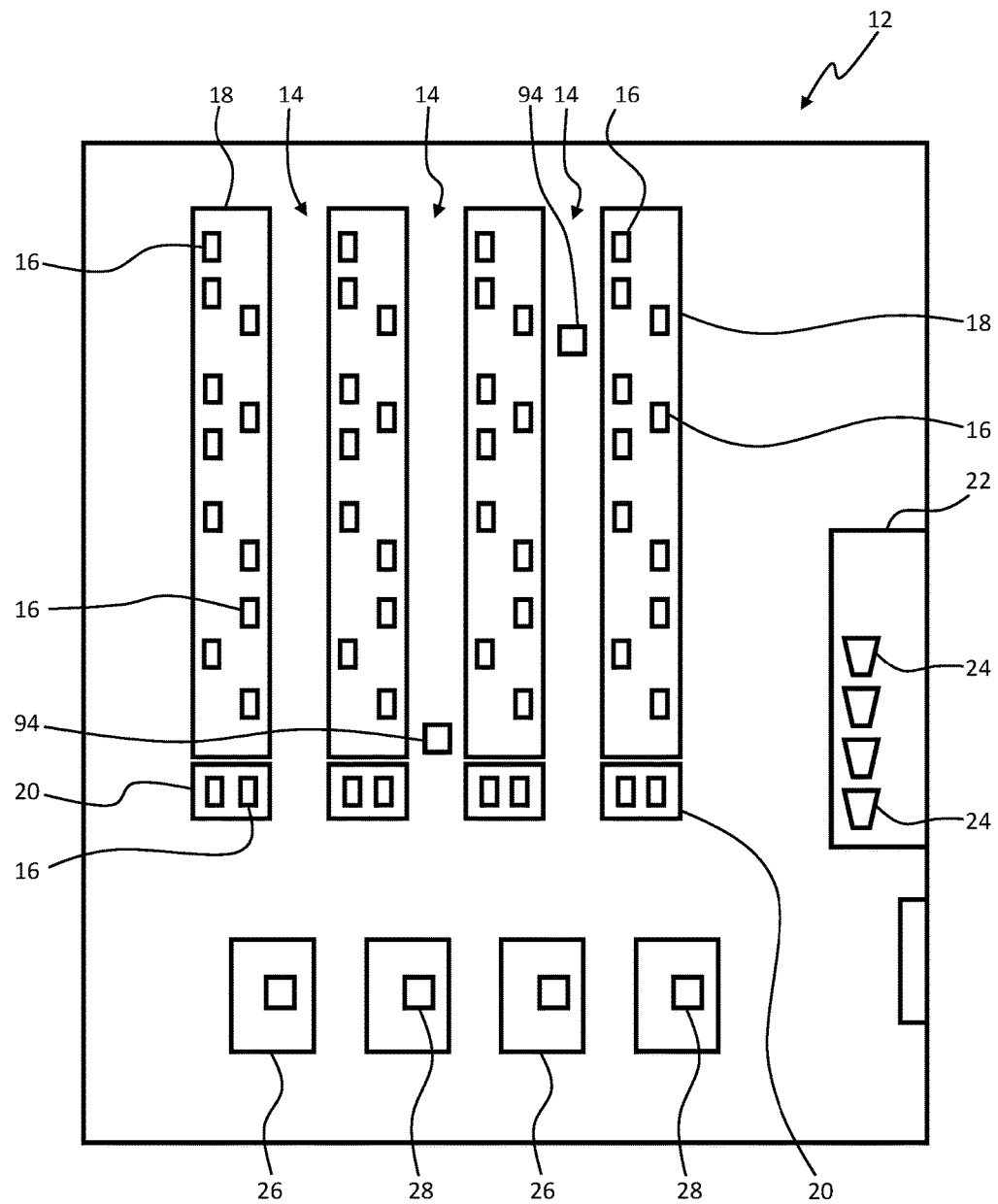
FIG. 1 is diagrammatic view of a shopping facility in accordance with some embodiments.

As illustrated in FIG. 1, a shopping facility 12 can typically include a plurality of aisles 14 having products 16 disposed therealong on various displays 18, such as shelving units, coolers, and the like, and on feature locations 20, which can be located at the end of the aisles 14, in free-standing displays, or the like. A cart corral 22 is typically located near an entrance to the shopping facility 12 with carts 24 generally contained therein. As a customer enters the shopping facility 12, the customer can therefore get one of the carts 24 for the shopping trip. Thereafter, the customer will travel through the shopping facility 12 collecting products 16 and proceed to one or more point-of-sale locations 26 having point-of-sale devices 28.

A system 50 for determining a weight of product 16 on a product support member 52 is shown in FIGS. 2-5. The product support member 52 can take any desired form, such as a shelving unit, a shelf, or a cart, each of which will be discussed below. The product support member 52 is at least partially supported by a suspension including one or more springs 54, which are configured to compress as products 16 are stocked on the product support member 52.

The system 50 further includes an EM wave generator 56 and an EM wave reader or sensor 58. The generator 56 can be mounted within the shopping facility 12 and oriented to emit non-visible EM waves, such as radio, infrared, or micro waves, towards the spring 54 and the spring 54 can be made of a material that reflects most or all EM waves, such as metal. Additionally, the reader 58 can be mounted within the shopping facility 12 and oriented to receive the reflections of the EM waves off of the spring 54. The generator and reader 56, 58 can be separate devices, in the same or separate housings, or can be incorporated into one device, such as a transceiver.

So configured, the generator 56 will emit EM waves towards the spring 54 and the reader 58 will receive reflections of the EM waves off of the spring 54. As discussed above, the spring 54 compresses as weight is added to the product support member 52, i.e., when products 16 are stocked thereon. As the spring 54 compresses, the metal of the spring 54 is condensed into a smaller area which will cause different reflection amplitude strengths and patterns over the area of the spring 54. Due to this, the reflections off the spring 54 can show the state of compression of the spring 54.

The reader 58 can be coupled to a control circuit 60 configured to analyze and process the reflections received thereby. The reader 58 can be hardwired to the control circuit 60 or can be configured to communicate wirelessly therewith utilizing any suitable network or protocol. With the wireless communication approach, the imager can include a suitable transmitter or transceiver configured to send signals over the selected network or protocol. Additionally, the term control circuit as used herein refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 60 may be configured (for example, by using corresponding programming stored in a memory as will be well understood by those skilled in the art) to carry out one or more of the steps, actions, and/or functions described herein.

As discussed above, the control circuit 60 can analyze the reflections received at each reader 58 to determine a state of compression of the spring 54. In a preferred approach, the control circuit 60 can be calibrated to accurately determine a current compression state. For example, the generator 56 and reader 58 can be configured or commanded to operate when the product support member 52 is empty and the spring 54 is fully extended, without any products 16 stocked thereon. The control circuit 60 can then analyze the reflections received at the reader 58 and associate the relatively expanded state of spring 54 and the relatively spread out high amplitude received reflections causing a lower overall amplitude received in the area of the spring 54 to a baseline level. Next, the generator 56 and reader 58 can be configured or commanded to operate when the product support member 52 has a fully stocked configuration with the products 16 thereon. The control circuit 60 can then analyze the reflections received at the reader 58 and associate the condensed state of the spring 54 and the relatively condensed high amplitude received reflections causing a higher overall amplitude received in the area of the spring 54 to a fully stocked level. Thereafter, the control circuit 60 can compare the strength and distribution of subsequently received reflections to the projection between the baseline level and the fully stocked level to generally determine a current stock level on the product support member 52.

In a further form, the control circuit 60 can retrieve or receive a total weight of the products 16 that can be stocked on the product support member 52 in a fully stocked configuration. So configured, the control circuit 60 can then determine a general percentage of compression of the spring 54 based on subsequently received reflections and determine an estimated total weight of products 16 on the product support member 52 indicated by the percentage with regard to the fully stocked configuration. By a further approach, the control circuit 60 can retrieve or receive an individual weight for the products 16 stocked on the product support member 52 and can estimate a number of products 16 on the product support member 52 based on the estimated total weight.

By some approaches, the frequency and/or amplitude of the EM waves can be adjusted to refine the accuracy of the reflections and therefore the estimated weight. By a first approach, the generator 56, which can be controlled by the control circuit 60, can modulate between frequencies and amplitude combinations so that the reader 58 receives reflections of a variety of EM waves. By a second approach, the control circuit 60 can determine an estimated weight, and the estimated compression of the spring 54, and based on the estimate, adjust the frequency and/or amplitude of the EM waves generated by the generator 56.

Figure 2:
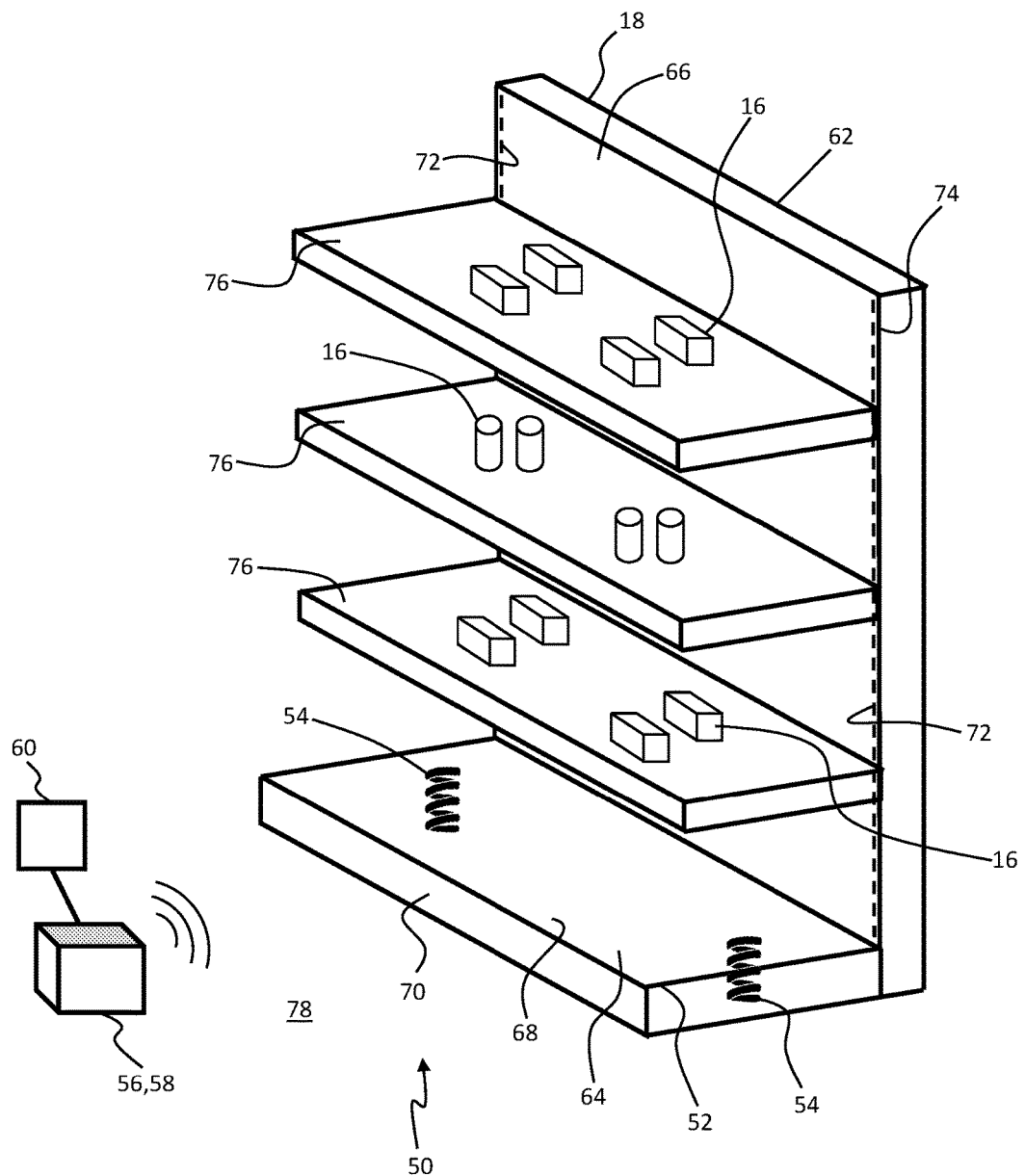
FIG. 2 is a perspective view of a first embodiment of a product weight estimation system in accordance with several embodiments.
Figure 4:
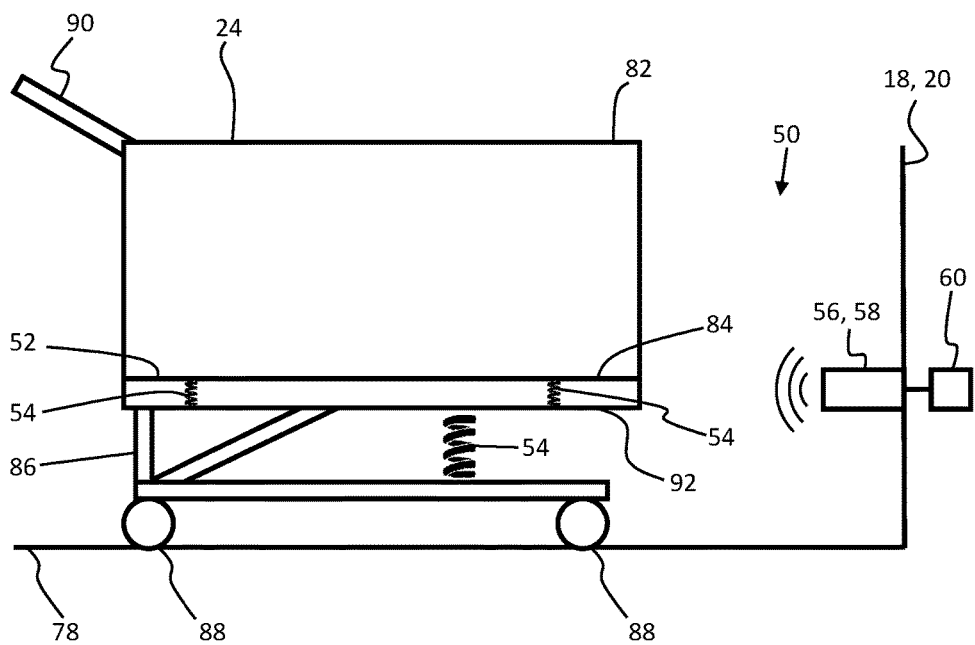
FIG. 4 is a third embodiment of a product weight estimation system in accordance with several embodiments.

Example product support members 52 are shown in FIGS. 2-4. One example product support member 52 is a shelving unit 62, as shown in FIG. 2. Based on a particular use, multiple shelving units 62 can be aligned in a row to produce an aisle in a shopping facility 12. The shelving unit 62 includes a base portion 64 and a back wall 66 extending upwardly therefrom. The base portion 64 can include a base deck 68 and an optional kick plate 70, as commonly configured. In one form, a plurality of shelf notches 72 are vertically disposed adjacent to lateral edges 74 of the back wall 66 to provide anchor points for product support members or shelves 76 mounted to the shelving unit 62. Of course, the shelves 76 can be mounted to the back wall 66 in any suitable way, including using hardware, snap-fit structure, friction fitting, or the like.

In this example, one or more of the springs 54 can be provided in the base portion 64 of the shelving unit 62, such as mounted to the base deck 68, to provide suspension for the entire shelving unit 62. The shelving unit 62 can include, one, two, three, four, or more springs 54, as desired. In order to emit EM waves towards the spring 54 and receive the reflections therefrom, the generator 56 and reader 58 can be mounted adjacent to a floor 78 of the shopping facility 12 so that the EM waves and reflections can travel under the base deck 68 so that the various parts of the shelving unit 62 do not interfere with the EM waves. By one approach, the generator 56 and reader 58 can be mounted within the base portion 64 of a shelving unit 62 across the aisle 14. By another approach, the generator 56 and reader 58 can be mounted at the end of the aisle 14.

With this configuration, the system 50 can be calibrated to the shelving unit 62 in an empty configuration and in a fully stocked configuration. As such, when the estimated weight of the shelving unit 62, based on the compression of the spring 54 and the reflections of the EM waves thereof, falls below a predetermined number, such as 50%, 40%, 30% or the like, the control circuit 60 can create a task for an associate to check on the stock levels of the shelving unit 62.

Another example product support member 52 is the shelf 76 of the shelving unit 62. By analyzing each shelf 76, the weight determination can be made for a limited number of a type of product 16, such as one or two, that are stocked on the shelf 76. In this example, the spring 54 can be provided as suspension within the connection between the shelf 76 and the back wall 66, as shown in FIG. 3. The shelf 76 can include, one, two, three, four, or more springs 54, as desired. By one approach, the generator 56 and reader 58 can be mounted in or adjacent to a ceiling 80 of the shopping facility 12 generally above the shelving unit 62 to emit the non-visible EM waves towards the spring 54 in the shelf-back wall connection and receive reflections therefrom. The shelving unit 62 can include separate springs 54 for each shelf 76 thereon. If desired, the springs 54 can be staggered when viewed from above so that each spring 54 can clearly receive and reflect EM waves.

With this configuration, the system 50 can be calibrated to the shelf 76 in an empty configuration and in a fully stocked configuration. As such, when the estimated weight of the shelf 76, based on the compression of the spring 54 and the reflections of the EM waves thereof, falls below a predetermined number, such as 50%, 40%, 30% or the like, the control circuit 60 can create a task for an associate to check on the stock levels of the shelf 76.

In another example, the product support member 52 can be in the cart 24, as shown in FIG. 4. As shown, the cart 24 includes a basket 82 having a bottom wall 84, a support structure 86, casters or wheel 88, and a handle 90. In this example, the spring 54 can be provided as a suspension for the basket 82 and with one end mounted to the bottom wall 84 thereof and a second end mounted to a plate or bracket 92 secured to the cart 24. In another example, the spring 54 can support the bottom wall 84 of the basket 82. With these configurations, the compression of the spring 54 provides an indication of a weight of products 16 in the basket 82 and a general indication of how many products 16 are in the basket 82. The cart 24 can include, one, two, three, four, or more springs 54, as desired. In this example, the generator 56 and reader 58 can be mounted generally at the same height as the spring 54, such as at the end of an aisle 14, to the shelving units 62, and so forth.

With this configuration, the system 50 can be calibrated to the basket 82 in an empty configuration and in a configuration having a known weight to establish a projection. Thereafter, the control circuit 60 can be configured to send a signal when the estimated weight of products 16 in the basket 82 exceeds a predetermined number, which would generally indicate a large number of products 16. The control circuit 60 can further be configured to create a task to assign additional associates to the point of sale locations 26 in response to determining that more than a predetermined number of carts within a predetermined time period have an estimated weight load over a predetermined number. This is particularly advantageous if the shopping facility 12 includes generators 56 and readers 58 are a plurality of locations throughout the facility to provide a gauge of customer traffic and purchase amounts.

For example, predetermined number of carts can be between 5 and 30, and more specifically between 10 and 20. The predetermined time can be between 5 minutes and 30 minutes, and more specifically between 5 minutes and 15 minutes. The predetermined number for the estimated weight can be between 10 pounds and 60 pounds, and more specifically be between 15 pounds and 30 pounds.

By one approach, the generator 56 and reader 58 can be mounted to a mobile assembly 94 to be moved through the shopping facility 12 and thereby emit EM waves and receive reflections from various locations throughout the facility 12. The mobile assembly 94 can be configured to be pushed by an associate, or can be self-propelled. The mobile assembly 94 can further be a robot configured to travel throughout the facility 12 and collect readings off the springs 54 therein.

For any of the embodiments above, the control circuit 60 can receive or retrieve sales data for the shopping facility 12, such as from the point of sale devices 28, and correlate the sales data to the estimated weight. For example, if the control circuit 60 detects a changing weight, but there are no sales of products 16 on the product support member 52, the control circuit 60 can create a task for an associate to check on the product support member 52. Similarly, if the estimated weight exceeds an expected amount for the product support member 52, the control circuit 60 can create a task for an associate to check on the product support member 52 to determine whether the correct product or amount of product is stocked on the product support member 52. Further, the control circuit 60 can determine that differential changes of the estimated weight reflect a change of weight different than expected, such as multiples of the intended products for the product support member 52, the control circuit 60 can create a task for an associate to check on the product support member 52. In the form where the product support member 52 is the shelving unit 62 or shelf 76, if the control circuit 60 determines that the sales data indicates that a percentage of one of the products 16 on the product support member 52 has been purchased, such as 50%, 60%, 75% of the stock level, with a corresponding change in estimated weight, the control circuit 60 can create a task to restock the product 16.

Figure 5:
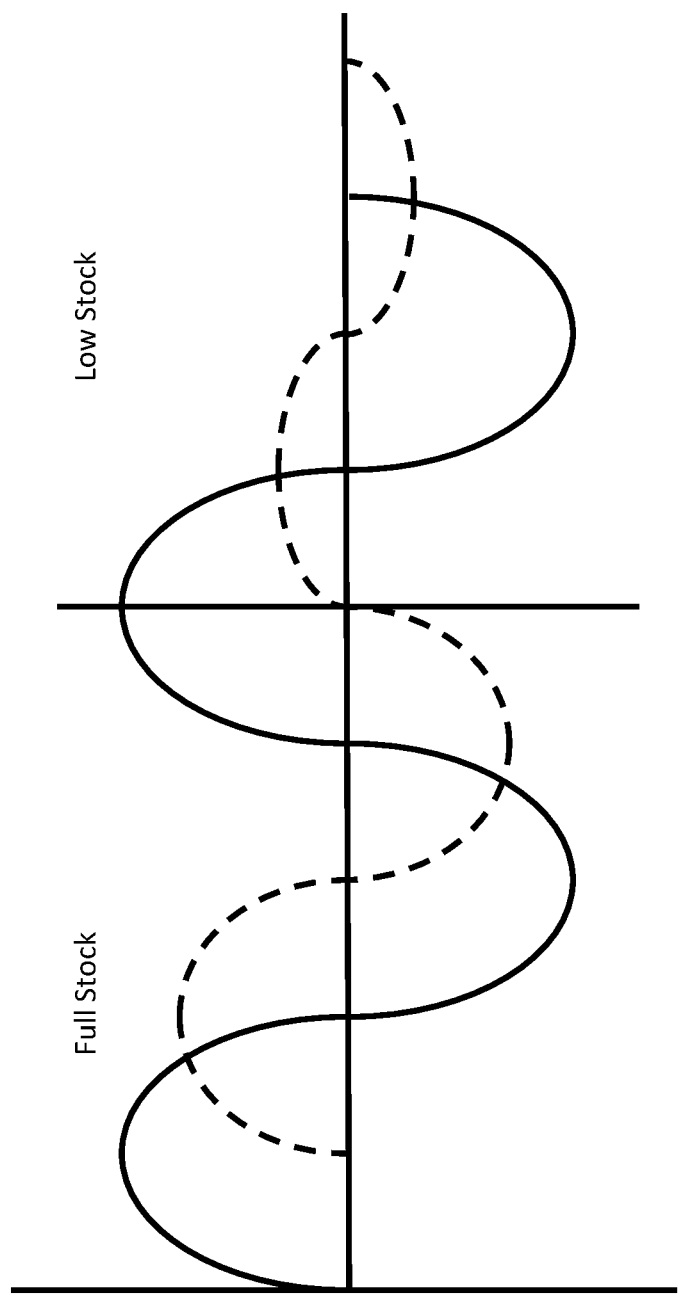
FIG. 5 is a graph in accordance with some embodiments.

In one example, FIG. 5 illustrates a comparison of the amplitude and phase of generated EM waves and the amplitude and phase of received reflections of the EM waves based on whether the spring 54 is compressed. The signal of the generated waves is shown in solid lines, while the signal of the received reflections is shown in dashed lines. The left portion of the graph shows that, when the spring 54 is compressed, a large proportion of the generated EM waves are received as reflections within a defined area causing a relatively high amplitude. This indicates that a large majority of the EM waves hit reflective surfaces within the defined area, as discussed above. Such a reading would coincide with a spring 54 in a compressed state, which increases the reflective surfaces within the defined area. Further, the phase is shown as offset, but regular to the phase of the generated EM signal. The right portion of the graph, however, shows that, when the spring is relatively uncompressed, a decreased proportion of the generated EM waves are received as reflections within the defined area relative to the left portion causing a relatively low amplitude. This indicates that a majority of the generated EM waves failed to reflect off of reflective surfaces. Such a reading would coincide with the spring 54 being in a relatively uncompressed state, which provides greater gaps of space between the spring windings as compared to the compressed spring 54. As with the left portion, the right portion is also offset set, but regular to the phase of the generated EM signal. As described above, by setting baseline readings with a fully stocked product support member 52 and an empty product support member 52, the amplitude or received signal strength of the reflections of generated EM waves can be used to identify low stock levels and track product movement.

In some embodiments, a weight detection system for a product support member within a facility is described herein that includes a product support member configured to receive one or more products thereon and a spring supporting the product support member. The spring is configured to compress in response to products being placed on the product support member. The system further includes an electromagnetic (EM) wave generator configured to sequentially emit non-visible EM waves towards the spring; an EM wave reader configured to sequentially receive reflections of the non-visible EM waves from the spring, wherein different compression levels of the spring result in different reflections of the non-visible EM waves; and a control circuit operably coupled to the EM wave reader and configured to receive and compare reflections received at different times to detect changes in the reflections to thereby determine changes in weight of products on the product support member.

By several approaches, the control circuit can be configured to be calibrated by receiving reflections of the non-visible EM waves off the spring with no products on the product support member to establish a baseline reading and receiving reflections of the non-visible EM waves off the spring with the product support member in a fully stocked configuration to establish a top end reading.

By some approaches, the product support member can be a cart configured to receive products therein; and the spring can be a suspension of the cart. By other approaches, the product support member can be a shelving unit having a back wall, a base portion, and one or more shelves mounted to the back wall; and the spring can be a suspension of the shelving unit disposed within the base portion thereof. By yet other approaches, the product support member can be a shelf configured to mount to a back wall of a shelving unit;

and the spring can be a suspension connection between the shelf and shelving unit back wall.

By several approaches, the control circuit can further be configured to create a task to send an associate to check on a stock level for the shelving unit in response to determining that the reflections indicate that a compression of the spring is less than a predetermined value.

By some approaches, the control circuit can further be configured to receive product sales information for the facility; and correlate the product sales information to the changes in the reflections.

Figure 6:
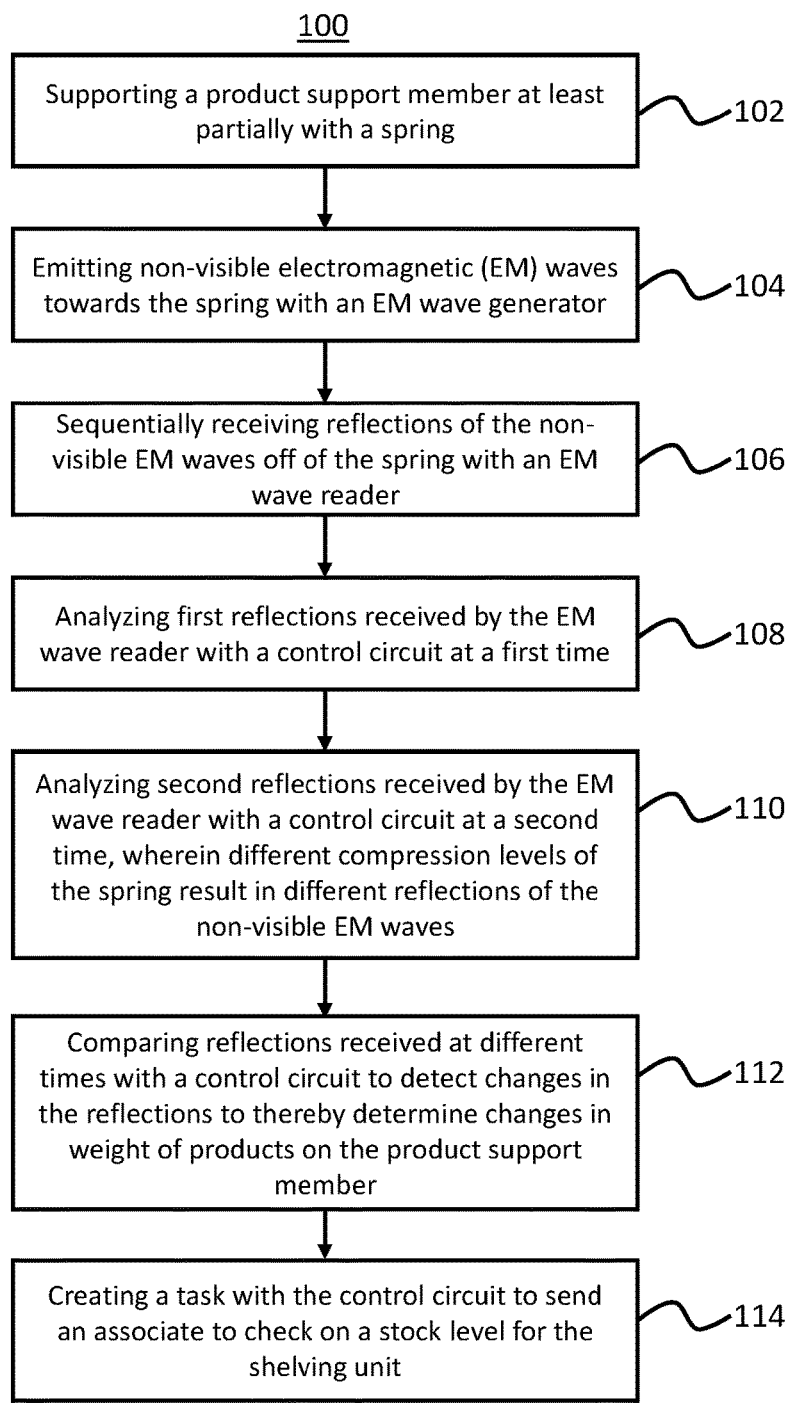
FIG. 6 is a flowchart in accordance with several embodiments.

In several embodiments and as shown in FIG. 6, a method 100 for detecting weight supported by a product support member within a facility is described herein that includes supporting 102 a product support member at least partially with a spring; emitting 104 non-visible electromagnetic (EM) waves towards the spring with an EM wave generator; sequentially receiving 106 reflections of the non-visible EM waves off of the spring with an EM wave reader; analyzing 108 first reflections received by the EM wave reader with a control circuit at a first time; analyzing 110 second reflections received by the EM wave reader with a control circuit at a second time, wherein different compression levels of the spring result in different reflections of the non-visible EM waves; and comparing 112 reflections received at different times with a control circuit to detect changes in the reflections to thereby determine changes in weight of products on the product support member. It is understood that in some embodiments, the method of FIG. 5 can be performed at least by any of the structures described herein and any other devices.

By some approaches, the method can further include calibrating the control circuit by receiving reflections of the non-visible EM waves off of the spring with no products on the product support member to establish a baseline reading and receiving reflections of the non-visible EM waves off of the spring with the product support member in a fully stocked configuration to establish a top end reading.

By several approaches, supporting the product support member at least partially with the spring can include supporting a cart configured to receive products therein at least partially with the spring. By other approaches, the product support member can include a shelving unit having a back wall, a base portion, and one or more shelves mounted to the back wall; and supporting the product support member at least partially with the spring can include supporting the shelving unit at least partially with the spring disposed within the base portion thereof. By yet other approaches, the product support member can include a shelf configured to mount to a back wall of a shelving unit; and supporting the product support member at least partially with the spring can include supporting the shelf with the spring disposed between a connection between the shelf and the shelving unit back wall.

By some approaches, the method can further include creating 114 a task with the control circuit to send an associate to check on a stock level for the shelving unit in response to determining that the reflections indicate that a compression of the spring is less than a predetermined value.

By several approaches, the method can further include receiving product sales information for the facility; and correlating the product sales information to the changes in the reflections.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A weight detection system for a product support member within a facility, the system comprising:
   a product support member configured to receive one or more products thereon;
   a spring supporting the product support member, the spring configured to compress in response to products being placed on the product support member;
   an electromagnetic (EM) wave generator configured to sequentially emit non-visible EM waves towards the spring;
   an EM wave reader configured to sequentially receive reflections of the non-visible EM waves from the spring, wherein different compression levels of the spring result in different reflections of the non-visible EM waves;
   a control circuit operably coupled to the EM wave reader and configured to receive and compare reflections received at different times to detect changes in the reflections to thereby determine changes in weight of products on the product support member.

2. The system of claim 1, wherein the EM wave generator and the EM wave reader comprise an EM transceiver.

3. The system of claim 1, wherein the EM wave generator and the EM wave reader utilize radio waves.

4. The system of claim 1, wherein the EM wave generator and the EM wave reader utilize micro waves.

5. The system of claim 1, wherein the control circuit is configured to be calibrated by receiving reflections of the non-visible EM waves off the spring with no products on the product support member to establish a baseline reading and receiving reflections of the non-visible EM waves off the spring with the product support member in a fully stocked configuration to establish a top end reading.

6. The system of claim 1, wherein the product support member comprises a cart configured to receive products therein; and the spring comprises a suspension of the cart.

7. The system of claim 6, wherein the EM wave generator and the EM wave reader are mounted within the facility at a height generally aligned with a height of the spring.

8. The system of claim 1, wherein the product support member comprises a shelving unit having a back wall, a base portion, and one or more shelves mounted to the back wall; and the spring comprises a suspension of the shelving unit disposed within the base portion thereof.

9. The system of claim 8, wherein the EM wave generator and the EM wave reader are mounted within the facility adjacent to a floor thereof aligned with a height of the spring to emit EM waves into the base portion of the shelving unit.

10. The system of claim 8, wherein the control circuit is further configured to create a task to send an associate to check on a stock level for the shelving unit in response to determining that the reflections indicate that a compression of the spring is less than a predetermined value.

11. The system of claim 1, wherein the product support member comprises a shelf configured to mount to a back wall of a shelving unit; and the spring comprising a suspension connection between the shelf and shelving unit back wall.

12. The system of claim 11, wherein the EM wave generator and the EM wave reader are mounted within the facility above the shelving unit.

13. The system of claim 1, wherein the EM wave generator and the EM wave reader are mounted to a mobile assembly.

14. The system of claim 1, wherein the control circuit is further configured to:
receive product sales information for the facility; and
correlate the product sales information to the changes in the reflections.

15. A method for detecting weight supported by a product support member within a facility, the method comprising:
supporting a product support member at least partially with a spring;
emitting non-visible electromagnetic (EM) waves towards the spring with an EM wave generator;
sequentially receiving reflections of the non-visible EM waves off of the spring with an EM wave reader;
analyzing first reflections received by the EM wave reader with a control circuit at a first time;
analyzing second reflections received by the EM wave reader with a control circuit at a second time, wherein different compression levels of the spring result in different reflections of the non-visible EM waves; and
comparing reflections received at different times with a control circuit to detect changes in the reflections to thereby determine changes in weight of products on the product support member.

16. The method of claim 15, further comprising calibrating the control circuit by receiving reflections of the non-visible EM waves off of the spring with no products on the product support member to establish a baseline reading and receiving reflections of the non-visible EM waves off of the spring with the product support member in a fully stocked configuration to establish a top end reading.

17. The method of claim 15, wherein supporting the product support member at least partially with the spring comprises supporting a cart configured to receive products therein at least partially with the spring.

18. The method of claim 15, wherein the product support member comprises a shelving unit having a back wall, a base portion, and one or more shelves mounted to the back wall; and supporting the product support member at least partially with the spring comprises supporting the shelving unit at least partially with the spring disposed within the base portion thereof.

19. The method of claim 18, further comprises creating a task with the control circuit to send an associate to check on a stock level for the shelving unit in response to determining that the reflections indicate that a compression of the spring is less than a predetermined value.

20. The method of claim 15, wherein the product support member comprises a shelf configured to mount to a back wall of a shelving unit; and supporting the product support member at least partially with the spring comprises supporting the shelf with the spring disposed between a connection between the shelf and the shelving unit back wall.

21. The method of claim 15, further comprising:
receiving product sales information for the facility; and
correlating the product sales information to the changes in the reflections.

* * * * *